US00RE48353E

(19) United States
(12) Reissued Patent
Kohls et al.

(10) Patent Number: US RE48,353 E
(45) Date of Reissued Patent: Dec. 15, 2020

(54) PLASTIC AEROSOL CONTAINERS

(71) Applicant: OXYGON TECHNOLOGIES, INC., St. Thomas (CA)

(72) Inventors: Raymond Melvin Kohls, London (CA); James Thomas Harris, London (CA)

(73) Assignee: Oxygon Technologies, Inc., St. Thomas (CA)

(21) Appl. No.: 16/037,224

(22) Filed: Jul. 17, 2018

Related U.S. Patent Documents

Reissue of:
(64) Patent No.: 9,394,098
Issued: Jul. 19, 2016
Appl. No.: 14/315,797
Filed: Jun. 26, 2014

U.S. Applications:
(60) Provisional application No. 61/840,577, filed on Jun. 28, 2013.

(51) Int. Cl.

| | |
|---|---|
| ***B65D 83/38*** | (2006.01) |
| ***B65D 83/20*** | (2006.01) |
| ***B67D 1/04*** | (2006.01) |
| ***B65D 83/48*** | (2006.01) |
| ***B65D 83/70*** | (2006.01) |

(52) U.S. Cl.
CPC ..... *B65D 83/384* (2013.01); *B65D 83/20* (2013.01); *B65D 83/205* (2013.01); *B65D 83/38* (2013.01); *B65D 83/48* (2013.01); *B65D 83/70* (2013.01); *B67D 1/0412* (2013.01); *F17C 2270/0718* (2013.01)

(58) Field of Classification Search
None
See application file for complete search history.

(56) References Cited

U.S. PATENT DOCUMENTS 3,157,321 A 11/1964 O'Donnell
3,278,086 A * 10/1966 Clouzeau et al. ..... 222/135
(Continued)

FOREIGN PATENT DOCUMENTS

CA 2841083 2/2013
EP 0568983 11/1993
(Continued)

OTHER PUBLICATIONS

U.S. Office Action dated May 11, 2015 in U.S. Appl. No. 14/315,797.
(Continued)

*Primary Examiner* — Glenn K Dawson
(74) *Attorney, Agent, or Firm* — Ajay A. Jagtiani; Miles & Stockbridge P.C.

(57) ABSTRACT

A container for dispensing pressurized fluid, such as an aerosol. The container includes a plastic bottle having a top portion, tapered neck, main body and a bottom. The top portion and tapered neck are covered by an adapter collar for providing a safety cover. The adapter collar can further have a valve assembly for dispensing the fluid contained in the bottle. A based cover can be further provided to cover the bottom of the bottle. The bottle, adapter collar and base cover can be covered and secured together, in part, by a sleeve such as a heat shrink sleeve.

15 Claims, 5 Drawing Sheets

(56) References Cited

U.S. PATENT DOCUMENTS

| | | | | | |
|---|---|---|---|---|---|
| 3,698,586 | A * | 10/1972 | Terner | B65D 23/0878 | 156/86 |
| 3,912,100 | A | 10/1975 | Graham et al. | | |
| 4,007,246 | A | 2/1977 | Bailey | | |
| 1,522,934 | A | 8/1978 | Heckman et al. | | |
| 4,190,168 | A * | 2/1980 | Jacques | B65D 23/0878 | 215/12.2 |
| 4,883,188 | A * | 11/1989 | Barth | B65D 23/001 | 215/12.1 |
| 5,083,684 | A * | 1/1992 | Ebina | B29C 45/26 | 222/394 |
| 5,224,630 | A * | 7/1993 | Pope et al. | 222/183 | |
| 5,320,255 | A * | 6/1994 | Stoffel et al. | 222/212 | |
| 5,641,095 | A * | 6/1997 | de Laforcade | B65D 83/206 | 222/182 |
| 6,390,326 | B1 * | 5/2002 | Hung | B65D 83/38 | 220/616 |
| 6,824,001 | B2 * | 11/2004 | Johnson | B29C 63/42 | 215/12.1 |
| 7,028,866 | B2 * | 4/2006 | Kunesh | B65D 83/38 | 215/382 |
| 7,097,078 | B2 * | 8/2006 | Sanchez | B65D 83/206 | 222/402.21 |
| 7,757,905 | B2 * | 7/2010 | Strand | B65D 83/22 | 222/153.11 |
| 8,025,189 | B2 * | 9/2011 | Salameh | B29C 66/12441 | 222/402.1 |
| 8,276,788 | B2 * | 10/2012 | Lyda | B65D 83/205 | 222/146.3 |
| 2005/0274687 | A1 * | 12/2005 | McCutchan | B65D 23/0878 | 215/12.2 |
| 2007/0245538 | A1 * | 10/2007 | Salameh | B29C 66/1224 | 29/453 |
| 2011/0017701 | A1 | 1/2011 | Soliman | B65D 83/38 | 215/381 |
| 2012/0211457 | A1 | 8/2012 | Patel et al. | B65B 31/003 | 215/42 |
| 2012/0211458 | A1 | 8/2012 | Patel et al. | | |
| 2013/0082074 | A1 | 4/2013 | Armstrong et al. | B65D 83/38 | 222/402.1 |
| 2018/0312328 | A1 * | 11/2018 | Sugawara | B65D 83/38 | |

FOREIGN PATENT DOCUMENTS

| | | |
|---|---|---|
| FR | 2346130 | 10/1977 |
| FR | 24346130 | 10/1977 |
| GB | 1522934 | 8/1978 |
| WO | WO2007051229 | 5/2007 |
| WO | WO2009032762 | 3/2009 |

OTHER PUBLICATIONS

U.S. Office Action dated Sep. 15, 2015 in U.S. Appl. No. 14/315,797.
U.S. Office Action dated Dec. 3, 2015 in U.S. Appl. No. 14/315,797.
International Search report and Written Opinion issued in International Patent Application No. PCT/IB2014/002142 dated Jan. 29, 2015.

* cited by examiner

PLASTIC AEROSOL CONTAINERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This application claims the benefit of U.S. provisional application Ser. No. 61/840,577 filed Jun. 28, 2013, the contents of which are incorporated herein in their entirety by reference.]

*CROSS-REFERENCE TO RELATED APPLICATIONS*

*This is a reissue application of U.S. Pat. No. 9,394,098, issued on Jul. 19, 2016, which claims the benefit of U.S. Provisional Patent Application No. 61/840,577, filed on Jun. 28, 2013. The entire contents of all of the above-referenced application are incorporated herein by reference.*

FIELD

The present invention relates to a plastic container for storing pressurized fluid, and in particular, to a plastic bottle having burst safe features for dispensing pressurized or aerosol products.

BACKGROUND

Containers for storing and dispensing aerosols are known in the art. The containers are generally constructed of metals to withstand elevated pressure inside the container. Although a strong and reliable material, metals can be expensive and suffer disadvantages such as rusting and incompatibility with fluids to be stored in the container. Plastics, on the other hand, provide advantages such as economy of manufacture, compatibility with many fluids and overall aesthetic appeal to the consumer.

Containers for storing pressurized fluids are subject to various standards and regulations, such as the "Aerosol Containers and Gas Cartridges for Transport of Dangerous Goods." The governing standards and regulations in certain markets can prevent many container designs from being commercialized. Moreover, additional protocols, such sections addressing the "Minimum Burst Pressure," can create difficulties for plastic containers.

Bottle designs have been adapted to comply with the many standards. For example, designs have addressed the standards with the use of higher yield plastics, bottle neck finishes and bottle geometry. Despite previous attempts to manufacture plastic containers for dispensing pressurized fluids, costs have continued to increase. Thus, there remains a need to address at least three main design elements; safety, bottle defects and deformation issues and compliance with current industry standards, for example, as they relate to "Design and Construction of Plastic Aerosol Containers."

SUMMARY

The present invention provides a container that includes a bottle having a top portion, a tapered neck portion, a main body and a bottom. The top portion defines an opening in the bottle. A valve assembly can be positioned in the opening of the bottle. The valve assembly is capable of dispensing a pressurized fluid contained in the bottle. The bottle can further have an adapter collar. The adapter collar can surround or cover the top portion of the bottle and all or part of the tapered neck portion of the bottle.

In one embodiment, the adapter collar is in contact with a surface on the top portion and a surface of the tapered neck portion of the bottle.

In another embodiment, the adapter collar further surrounds a portion of the main body of the bottle. Preferably, the portion of the main body of the bottle is adjacent or abuts to the tapered neck portion of the bottle.

In one embodiment, the adapter collar has an inner top surface facing the top portion of the bottle. The bottle has an outer top surface along its top portion such that the outer top surface faces the inner top surface of the adapter collar. These two surfaces of the adapter collar and the top portion of the bottle can be in direct contact with one another. The outer top surface of the top portion of the bottle can be contoured and the inner top surface of the adapter collar can be shaped to match or mirror the inner top surface to secure the adapter collar to the bottle. The outer top surface of the top portion of the bottle can be threaded and the inner top surface of the adapter collar can also be threaded such that the adapter collar can be screwed onto the bottle.

In another embodiment, the pressurized fluid in the container can be a liquid, such as an aerosol liquid that can be dispensed from the container by the valve assembly.

In one embodiment, the container can further include a base cover that fits onto the bottom of the bottle such that the base cover surrounds the bottom of the bottle. Preferably, the base cover is in direct contact with a surface of the bottom of the bottle. The base cover can further extend around the bottom of the bottle to surround a portion of the main body of the bottle. Preferably, the portion of the main body of the bottle is adjacent or abuts to the bottom of the bottle.

In another embodiment, the base cover can have one or more through holes, preferably arranged along its bottom surface. The one or more through holes can be capable of draining fluid that can be present between the inner surface of the base cover and the bottle, such as along the bottom of the bottle.

In one embodiment, the container can further include a sleeve, such as a heat shrink sleeve made of a thermoplastic polymer. The sleeve can be applied around the outside of the bottle and safety components, such as the adapter collar and base cover. The sleeve can surround the top portion, tapered neck portion and the main body of the bottle. Preferably, the adapter collar is arranged beneath the sleeve and the top portion and tapered neck portion of the bottle. The base cover, or a portion thereof, is also preferably arranged beneath the sleeve and the bottom and a portion of the main body of the bottle.

In another embodiment, the sleeve or a portion thereof can be in contact with the main body of the bottle or a portion thereof.

The present invention further provides a container that includes a plastic bottle having a top portion with arc opening, a tapered neck portion, a main body (e.g., cylindrical, rectangular) and a bottom. An adapter collar, preferably plastic, has an opening at its top is positioned over and contacts the top portion of the bottle such that the adapter collar surrounds the top portion and the tapered neck portion of the bottle. The opening in the adapter collar can be in register with the opening in the top portion. The adapter collar further includes a valve assembly secured in its opening Wherein the valve assembly fills the entire opening in the adapter collar. Thus, the valve assembly and the adapter collar together cover the opening in the top portion of the bottle. The adapter collar can be secured to the top portion of the bottle such that the bottle, adapter collar and valve assembly together contain a pressurized fluid residing inside the bottle.

The container above can further include a base cover and a sleeve, such as a heat shrink sleeve. The base cover fits on the bottom of the bottle and the sleeve tightly surrounds the bottle, adapter collar and base cover.

As noted above, the base cover can contain through holes for draining fluid and preferably the sleeve does not cover the through holes.

The bottle, adapter collar and base cover can be made of a thermoplastic polymer, such as polyethylene terephthalate (PET) or a glycol-modified polyethylene terephthalate (PETG).

BRIEF DESCRIPTION OF THE DRAWINGS

The following figures illustrate various aspects of one or more embodiments of the present invention, but are not intended to limit the present invention to the embodiments shown.

DETAILED DESCRIPTION OF THE PREFERRED EMBODIMENTS

As used herein, when a range such as 5-25 is given, this means at least or more than 5 and, separately and independently less than or not more than 25.

The present invention relates to improved containers for storing, and dispensing pressurized fluids and aerosol products or compositions. Plastic bottles for storing carbonated fluids, such as beverages, are known. Testing has shown that plastic bottles, such as those made of PET, are capable of burst pressures of 200 psi. At lower pressures in the range of 80 to 120 psi, testing has shown some deformation occurs. The plastic bottles are manufactured by blow molding processes, which can contribute to stress cracking and creep in transition areas. Transition areas can include seams and curved or tapered portions of the bottle, such as areas between the heavy wall top cap portion and/or tapered neck portion and the relatively thin wall main body (e.g., the cylindrical or substantially cylindrical area).

Transition areas in the plastic bottle can be considered weak points that suffer from an increased incident of deformation and burst. Thus, standard plastic bottles have not shown to be a safe and reliable solution to achieve minimum burst pressure requirements, for example, the 240 psi minimum burst pressure requirement for plastic aerosol containers. The containers described herein provide safe and cost-effective ways to achieve required burst pressures and provide a container having an aesthetic appeal. Further, an explosion of the containers described herein can be contained by the use of the adapter collar, base cover anti sleeve, which together or individually prevent pieces of the bottle from injuring a user or nearby person. The containers of the present invention are less dangerous than conventional metal containers storing pressurized fluid which can burst or explode into small and sharp projectile pieces.

Figure 1:
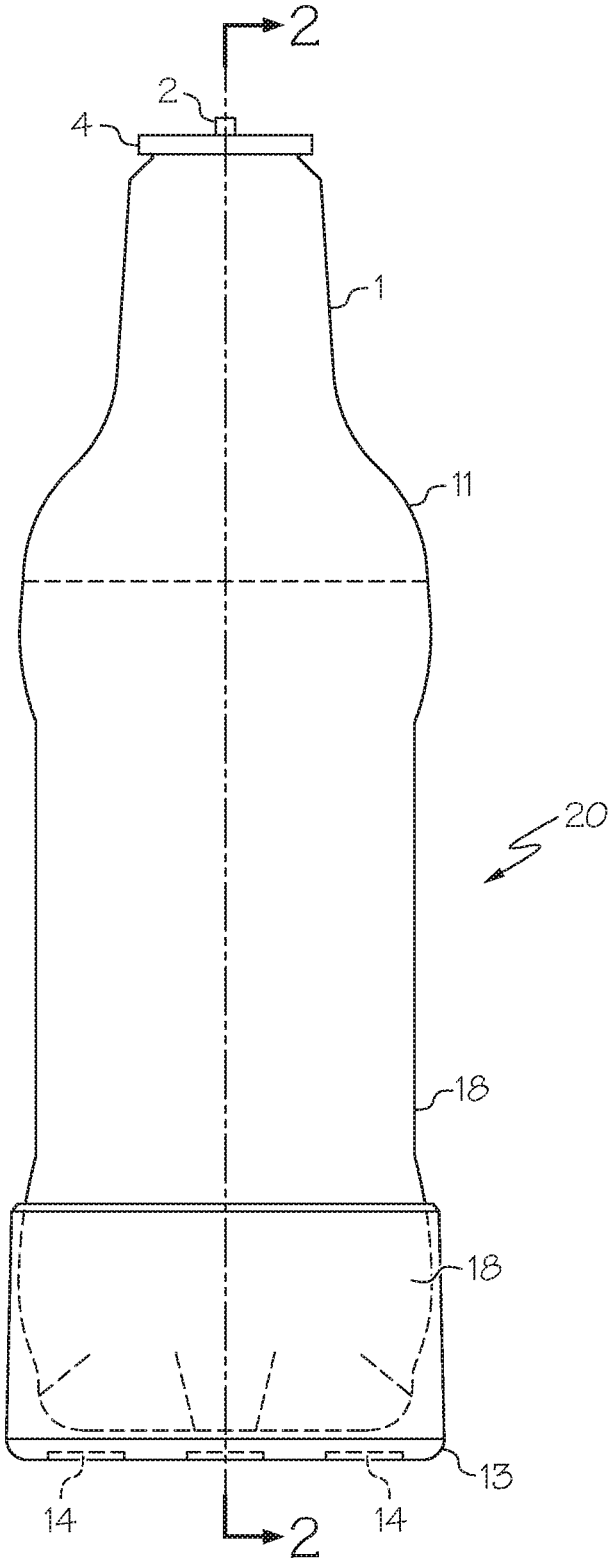
FIG. 1 shows a side view of a plastic bottle for containing and dispensing a pressurized fluid.

Referring now to the figures, wherein like reference numbers designate corresponding structure throughout the views, and referring in particular to FIG. 1, an assembled container 20 for storing and dispensing pressurized fluids (e.g., aerosols) is shown. The container 20 includes an adapter collar 1 positioned over the tapered neck and top portions of the bottle 18 and a base cover 13 positioned over the bottom of the bottle. The base cover is shown with multiple through holes 14 for draining any fluid that can be present between the bottle 18 and the inside of the base cover 13. At the top of the bottle, a valve assembly 2 for dispensing fluid is positioned in the bottle opening. The valve assembly 2 is secured to the adapter collar 1 along its flange 4 at its top. The valve assembly 2 can be a standard aerosol valve as known in the art.

The bottle 18 of the container 20 can be made of a thermoplastic material. For example, the thermoplastic material can be high density polyethylene (HDPE), low density polyethylene (LDPE), ultra high-molecular weight polyethylene (UHMWPE), polypropylene (PP), nylon and polyethylene terephthalate (PET). Alternatively, it is understood that any viable thermoplastic material may be used. The material may be transparent, opaque or partially opaque. In one embodiment, the bottle 18 is made of not permeable PET.

The adapter collar 1 of the container 20 can be made of any thermoplastic material, for example the materials noted above for the bottle. In a preferred embodiment, the adapter collar 1 is made of PET, which can he easily recycled. Like the bottle material, the adapter collar may be transparent, opaque or partially opaque. The adapter collar 1 can be made by conventional processes, such as injection molding. The adapter collar 1 can have an average thickness of 1 to 4 mm. The thickness of the adapter collar 1 can be uniform or varied as shown. If varied, the maximum thickness of the adapter collar can he in the range of 2 to 4 mm. The base cover 13 can made of the same or similar materials as the adapter collar 1.

Figure 2A:
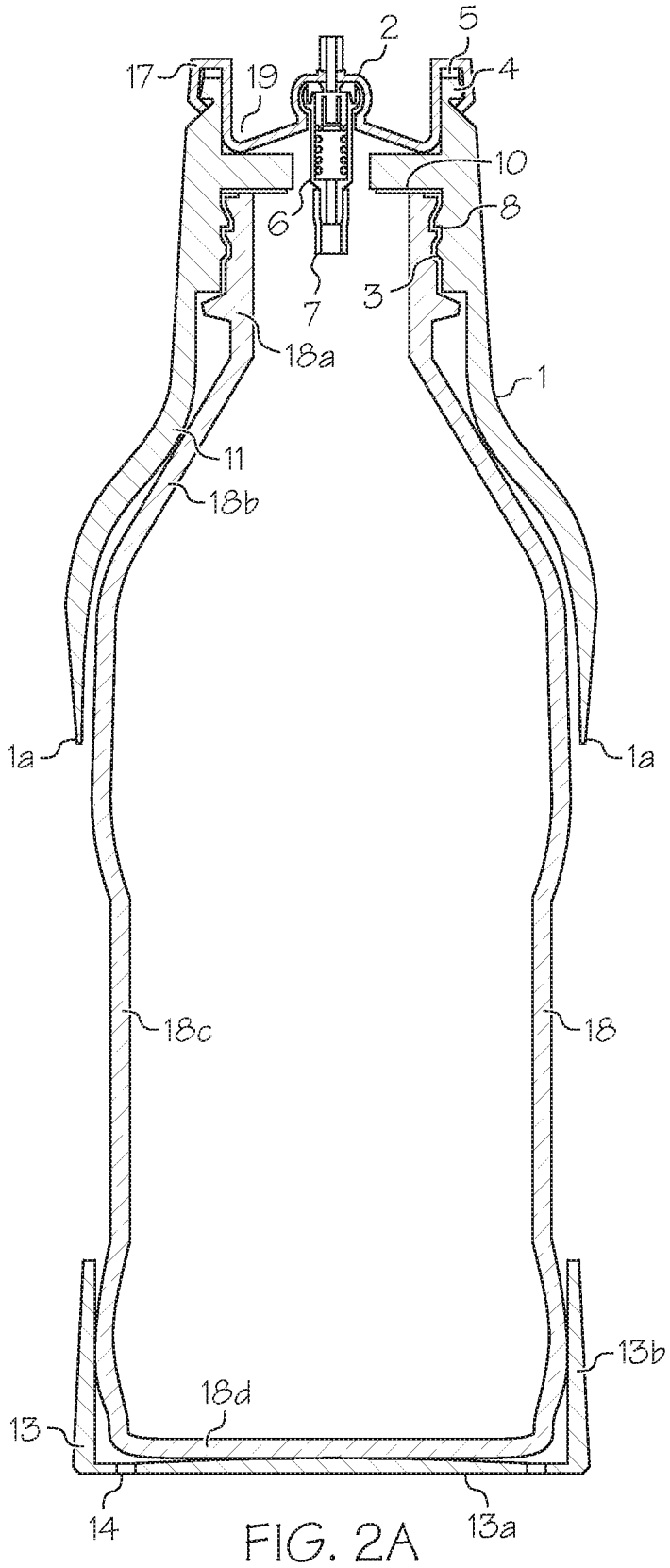
FIG. 2A shows a cross-section view of one embodiment of the plastic bottle of FIG. 1 along view line 2.

FIG. 2A shows an embodiment cross-section view along view line 2 of the container 20 of FIG. 1. The bottle 18 can include a top portion 18a. The top portion can have an opening, preferably circular in shape as known in the art. The top portion 18a can have an outer surface 3 that can be contoured. As shown, the outer surface 3 can have grooves or indents for securing, a cap or similar lid to the bottle for containing its contents. In one embodiment, the outer surface 3 can he threaded (see, e.g., FIG. 2B) to accommodate screw-on caps as known in the art. Example threaded surfaces can include those present in the beverage industry, such as 28 mm PCO 1810 or 1881. Another example threaded surface can include national pipe thread taper (N.P.T.) with openings having a diameter in the range of ¼ to 2 inches.

As shown, the adapter collar 1 can he secured to the bottle 18 by engaging its inner top surface 8 to follow the contours or profile of the outer surface 3 of the bottle. For example, the adapter collar 1 can be snapped onto the top portion of the bottle 1 or screwed on wherein the inner top surface 8 is threaded. The container 20 can optionally include a seal liner 10 positioned between the lip of the adapter collar 1 forming its opening and the top ledge of the opening in the bottle. For example, a threaded fitting arrangement between the adapter collar 1 and the top portion of the bottle may create a pressure tight seal wherein the seal liner can be excluded. Alternatively, a seal liner 10 can be used to ensure prevention of leaks and pressure from the bottle 18.

The seal liner 10 can be a ring that can rest on the top ledge of the opening of the bottle 18 prior to the adapter collar 1 being secured to the top portion 18a of the bottle. Preferably, the opening of the ring is in register with the openings in the adapter collar and bottle as discussed herein such that a portion of the valve assembly can extend through the ring to access contents of the bottle. As the adapter collar 1 is secured to the bottle, for example by a threaded fitting of the components, the seal liner can be compressed to prevent the contents of the bottle from leaking and loss of pressure in the bottle. The seal liner 10 can be made of a plastic or rubber material or the like and is preferably compatible with a wide range of materials. One example of material for the seal liner 10 is Polyliner 400L, ethylene vinyl acetate (EVA) compound or Viton.

The adapter collar 1 can have an opening in at its top and, as secured to the bottle 18, the opening in the adapter collar 1 can be in register or aligned with the opening in the top portion of the bottle to provide an access pathway to the inside of the bottle and the contents stored therein. The openings in the adapter collar and bottle provide a conduit for the valve assembly 2 to access the pressurized fluid in the container for dispensing purposes. The valve assembly 2, which can be a standard aerosol valve, can include a pickup tube 7 for contacting the pressurized fluid in the container and drawing the fluid up and through the valve assembly to be dispensed. The valve assembly 2 can further include a clearance hole 6 for providing a through hole for the fluid in the container to exit. Thus, once the top of the valve assembly 2 is depressed the clearance hole is opened and the pickup tube guides fluid through the clearance hole and out of the container.

The valve assembly 2 can be secured to the adapter collar 1 as shown. The adapter collar 1 can include a flange portion 4 such that a lip or rim is provided along its top. The flange 4 can follow along the entire opening in the adapter collar 1 such that it provided a circular ledge for the valve assembly to rest on. The flange 4 can be shaped to facilitate the crimp area 17 of the valve assembly so it can be secured to the adapter collar 1. The crimp area 17 can be bent around the flange 4 of the adapter collar to attach the valve assembly 2, preferably in a permanent or semi-permanent type of arrangement. A gasket 5, for example in the shape of a ring, optionally can be positioned between the crimp area 17 and the flange 4 to provide a seal for preventing leaks, such as the contents of the container front escaping. As the crimp area 17 of the valve assembly 2 is bent around the flange 4, the gasket 5 can become compressed by the force of the crimp seal to form a pressure tight seal to lock the valve assembly to the adapter collar 1 and secure the contents in the bottle once the collar is attached to the top portion of the bottle.

The flange 4 can further define the top of a central recessed area 19 in the top of the adapter collar 1 that extends from the flange 4 to the opening in the adapter collar 1 that exposes the internal cavity of the bottle 18. The central recessed area 19 can accommodate the main portion of the valve assembly 2 and provide a base area for the valve assembly 2 to contact to provide stability and structural integrity of the container 20.

The remaining portion of the adapter collar 1 below its inner top surface 8 is designed to follow the contours of the tapered neck portion 18b of the bottle. As shown, the adapter collar 1 can increase in diameter along its length, which can be referred to as an expansion section 11, to accommodate and surround the tapered neck potion. The adapter collar 1 can be in direct contact with the all or part of the outer surface of the tapered neck portion 18b.

In one embodiment, as shown, the adapter collar 1 can extend down from the expansion section 11 to surround a portion of the main body 18c of the bottle, for instance the top portion of the main body adjacent the tapered neck portion 18b. The adapter collar 1 can cover 10, 20, 30 or 40 percent of the main body area and can extend downward to surround 5 to 40 percent of the length of the main body portion 18c. The adapter collar 1 can be in contact with a surface of the main body 18c or, alternatively, surround a portion of the main body such that a gap between is created along the outer wall surface of the bottle along its main body and an inner surface of the adapter collar. The gap can be in the range of 1 to 15 mm or less than 12, 10, 8, 6, 4 or 2 mm.

The end portion 1a of the adapter collar 1 can be tapered to create thin point at its end. The taper reduces the wall thickness, preferably in a gradual manner, to provide a thin wall section of the adapter collar in the area of transition between the end point of the adapter collar and the uncovered main body portion of the bottle. The tapered end portion 1a can allow for a smooth transition to the uncovered section of the bottle to create an appealing, aesthetic appearance and accommodate layering the bottle with outer materials, such as a sleeve, as described below.

By covering the top portion 18a, the tapered neck portion 18b, and optionally a portion of the main body 18c of the bottle, the adapter collar 1 can act as a shield and prevent distortion in the bottle neck area, for example the bottle neck expanding from an increase of pressure of its contents. The adapter collar 1 can add protection and provide additional support to the bottle 18 in the weak area in the transition from the heavy wall top portion 18a of the bottle to the relatively thin wall main body portion 18c. For instance, pressure in the bottle can be redistributed in the areas where the adapter collar 1 contacts the bottle, e.g., as shown in the expansion section 11. The additional support and structural integrity that the adapter collar 1 provides for the bottle can allow the bottle to achieve a minimum burst pressure in the range of 200 to 300 psi, or at least 220, 240, 250, 260, 270, 280 or 290 psi. Further, the adapter collar 1 can function to provide a container 20 that complies with current standards for plastic aerosols, such as the minimum burst pressure.

The adapter collar 1 can also function as a safety shield. As shown, the adapter collar 1 can surround areas of a bottle that are subject to bursting under an increase in pressure of its contents, such as the neck area of a pressurized aerosol bottle. An increase in pressure or overpressure events, such as the bottle being exposed to a heat source, can cause the bottle contents (e.g., propellant) to reach dangerous levels and burst a hole in the bottle. The placement of the adapter collar 1 on the bottle 18 can shield individuals from fluids and shrapnel being ejected from the bottle during a burst.

FIG. 2A also shows a base cover 13 having a bottom 13a covering the bottom 18d of the bottle 18. The base cover 13 can be in direct contact with all or a portion of the bottom 18d of the bottle. The base cover 13 can cover the entire bottom 18d and extend radially outward from the bottom of the bottle and include a wall portion 13b. The wall portion 13b of the base cover 13 can extend upward along the length of the main body portion 18c of the bottle. The wall portion 13b can cover 10,. 20, 30 or 40 percent of the main body area and can extend upward to surround 5 to 40 percent of the length of the main body portion 18c near the transition area between the main body 18c and the bottom 18d of the bottle. The base cover 13 can have an average thickness of 0.5 to 3 mm.

The base cover 13 can include one or more through holes 14. For example, the base cover can have 1, 2, 3, 4, 5, 6 or more through holes. The through holes 14 can have any shape, such a circular, and can have any suitable diameter, for example, 2 to 20 mm. The through holes 14 can facilitate draining fluids away from the bottle. For example, the bottle can be exposed to fluids, such as a water bath or washing cycle, wherein fluids can be trapped along the base cover. The through holes 14 can ensure the bottom of the bottle and base area remains thy by allowing fluids to escape and not collect in the base cover. Draining farther prevents buildup of material in the base cover or the opportunity for the growth of mold or bacteria near the bottom of the bottle. Another advantage of the through holes 14 is detection of leaks from the bottle to signal that the container has a defect or hole.

Figure 2B:
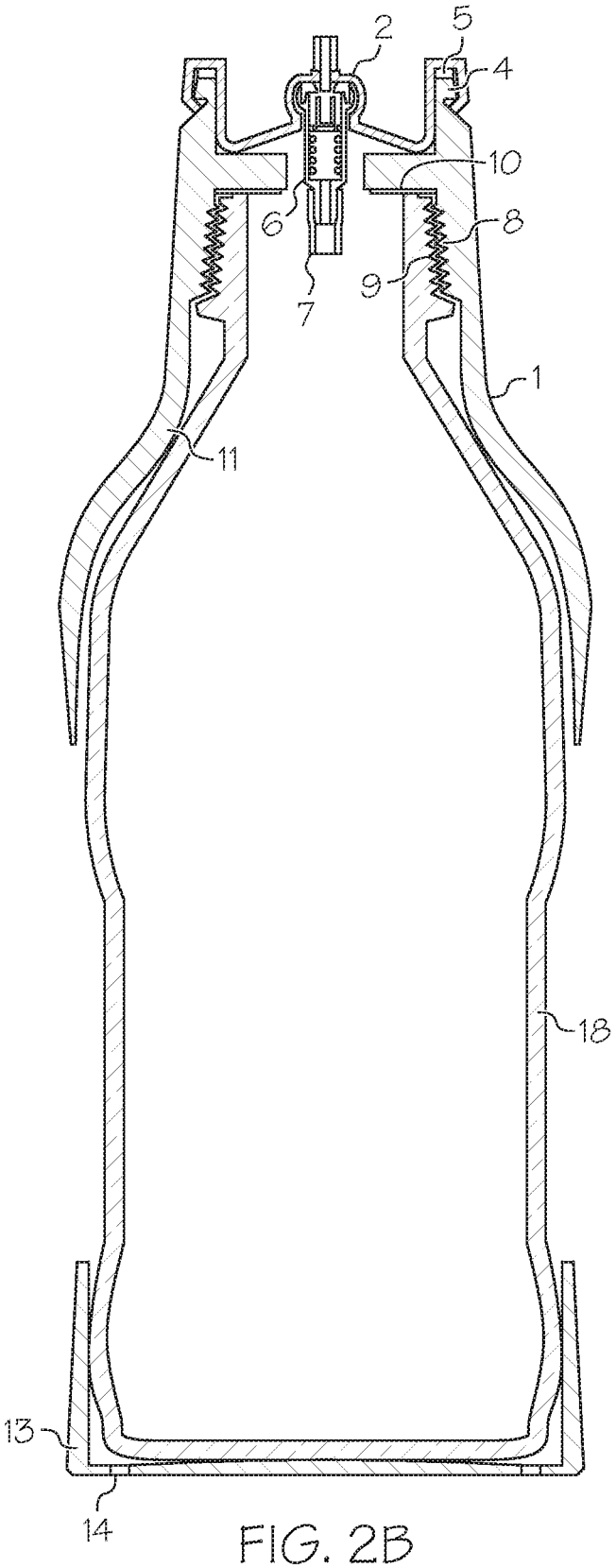
FIG. 2B shows a cross-section view of one embodiment of the plastic bottle of FIG. 2 along view line 2.

Turning to the remaining figures, FIG. 2B shows an embodiment of the cross-section view along view line 2 o f the container 20 of FIG. 1. The adapter collar 1 has a threaded inner top surface 8 for engaging the threaded outer surface 3 of the top portion 18a of the bottle. Bottles as known in the art can be used having standard thread arrangements as described above.

Figure 3:
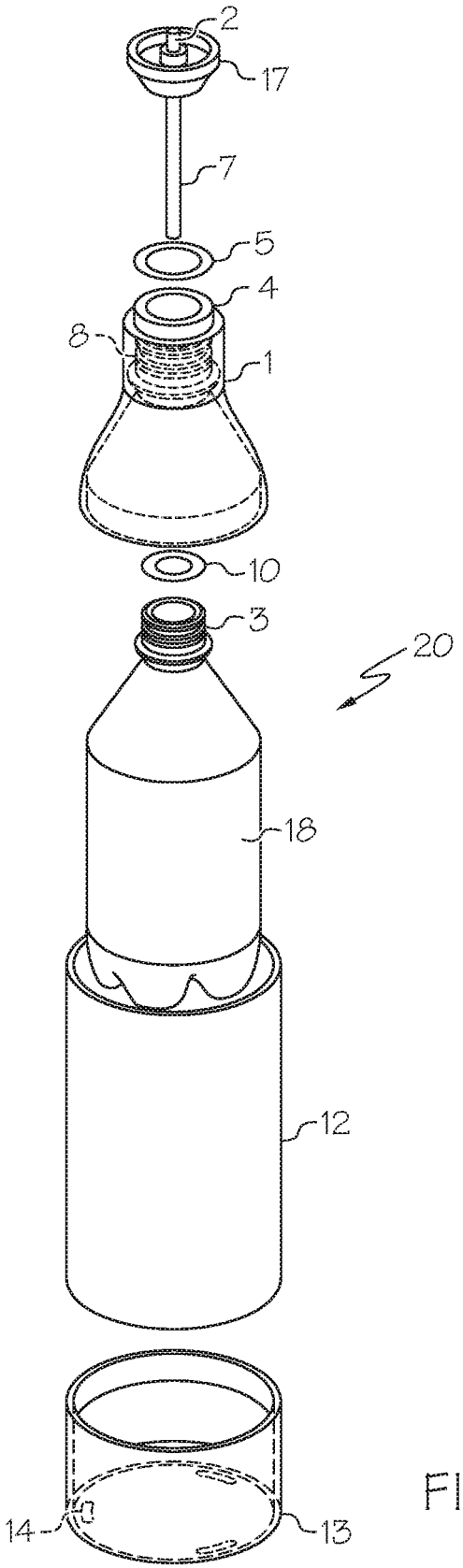
FIG. 3 shows an exploded view of a plastic bottle for containing and dispensing a pressurized fluid.

FIG. 3 shows an exploded view of art embodiment of a container 20. A valve assembly 2 having a crimp area 17 and a pickup tube 7 is arranged above a gasket 5 and an adapter collar 1. The adapter collar 1 has a flange portion 4 for engaging, the crimp area 17 of the valve assembly 2 and an inner top surface 8 adapted for securing the collar 1 to the top portion of the bottle 18. A seal liner 10 is shown between the adapter collar 1 and top edge of the bottle 18 to provide a pressure tight seal that prevents fluid and pressure leaks from inside the container 20. The bottom of the bottle rests in a base cover 13 having one or more through holes 14 for draining fluid.

The container 20 can farther include a sleeve 12. The sleeve 12 cart cover all or portions of the exposed outer surfaces of the bottle, adapter collar and base cover when present. Preferably, the sleeve 12 fits tightly around the exposed surfaces such that the sleeve 12 is in direct contact with all or portions of the exposed outer surfaces of the bottle, adapter collar and base cover when present. In one embodiment, the sleeve 12 can continuously cover the components (e.g., bottle, base cover, adapter collar) from bottom edge of the base cover 13 to the flange 4 of the adapter collar 1.

The sleeve 12 can be made from any suitable material, such as a thermoplastic. For example, the sleeve 12 can be made of a glycol-modified PET material, The sleeve 12 can be a heat shrink sleeve, preferably made of a plastic material. The sleeve 12 can also be made with a plastic material having non-slip characteristics. The sleeve 12 can have an average thickness of 50 to 150 microns.

With a heat shrink sleeve 12, the sleeve can be positioned around the bottle and various components as partially shown in FIG. 3. The sleeve can be heated, for example in the range of 100 to 150° C., so as to shrink and closely conform to and securely interconnect together the adapter collar 1, bottle 18 and base cover 13. Heating and shrinking can be completed with hot air, steam or infrared. The glycol-modified PET material has a tensile strength in excess of 10,000 psi and thus provides another protective layer having many advantages.

The sleeve 12 can provide a safety shield to the bottle, adapter collar and base cover. The high tensile strength of the sleeve 12 can prevent projectile fluid and bottle pieces from contacting a user or nearby person. The sleeve 12 can further function to provide structural integrity of the container, prevent deformation and redistribute pressure in the bottle for better conformance with industry regulations, such as the minimum burst pressure. To the extent the sleeve 12 fits tightly around the adapter collar 1, the sleeve 12 can function to secure the adapter collar Ito the bottle 18, for example, it can prevent any backing off of threads that can cause fluid leakage and pressure loss.

The sleeve 12 further provides a tamper evident layer around the bottle add components which positively prevents undetected, unauthorized tampering with the container. The sleeve 12 can further serve as a substrate for printing indicia, such as advertising, on the container.

Figure 4:
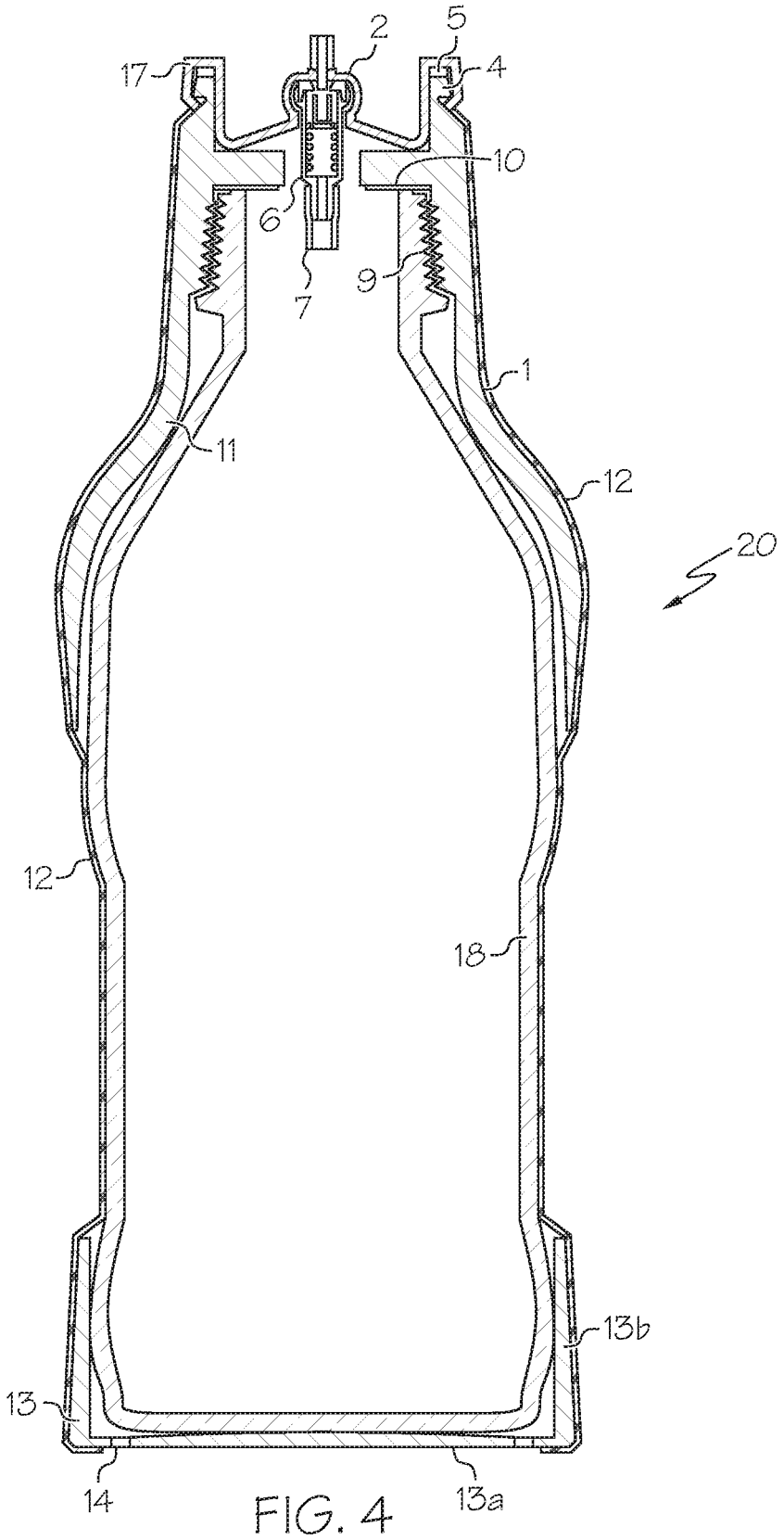
FIG. 4 shows a cross-section view of a plastic bottle for containing and dispensing a pressurized fluid.

FIG. 4 shows an embodiment of the cross-section view along view line 2 of the container 20 of FIG. 1. In particular, a sleeve 12 is covering substantially the entire vertical surface of the container as shown in the upright position. The sleeve 12 extends from the bottom of the flange 4 of the adapter collar 1 and the crimp area 17 of the valve assembly 2 along the entire outer surface of the collar 1 and onto the remaining portion of the main body of the bottle 18 not covered by the collar 1. The sleeve 12 can further extend along the main body of the bottle and cover the wall portion 13b of the base cover 13 and a portion of the bottom 13a of the base cover. As shown, the sleeve 12 is secured around the bottom edge of the base cover 13. Preferably, the sleeve 12 does not cover or interfere with through holes 14 in the base cover 13 so draining of fluids is not impeded.

The sleeve 12 provides a continuous layer over the bottle and components and provides a gradual and smooth surface between the transition areas of the container 20. For example, the end point of the adapter collar 1 and the main body of the bottle can create a gap and thus the adapter collar 1 can appear as a bump along the surface of the bottle. The same bump appearance can be created by the wail portion of the base cover. The sleeve 12 can cover these transition areas to provide a smooth, aesthetic surface for the consumer.

While various embodiments in accordance with the present invention have been shown and described, it is understood the invention is not limited thereto, and is susceptible to various changes and modifications as known to those skilled in the art. Therefore, this invention is not limited to the details shown and described herein.

What is claimed is:

[1. A container comprising:

a bottle comprising a top portion, a tapered neck portion, a main body and a bottom, wherein the top portion defines an opening, in the bottle;

a valve assembly positioned in the opening in the bottle, the valve assembly capable of dispensing a pressurized fluid contained in the bottle;

an adapter collar attached to the bottle, the adapter collar positioned over the top portion of the bottle, the adapter collar surrounding the top portion and tapered neck portion of the bottle and the adapter collar having a threaded inner top surface and the top portion of the bottle having a threaded outer top surface, the threaded inner top surface of the adapter collar being in contact with the threaded outer top surface of the bottle and the adapter collar having an opening and a flange provided along the entire opening, the flange being shaped to facilitate a crimp area for securing the valve assembly to the adapter collar.]

2. The container of claim [1] *3*, the adapter collar being in contact with a surface of the top portion and a surface of the tapered neck portion of the bottle.

3. [The container of claim 1] *A container comprising:*

*a bottle comprising a top portion, a tapered neck portion, a main body and a bottom, wherein the top portion defines an opening in the bottle;*

*a valve assembly positioned in the opening in the bottle, the valve assembly capable of dispensing a pressurized fluid contained in the bottle;*

*an adapter collar attached to the bottle, the adapter collar positioned over the top portion of the bottle, the adapter collar surrounding the top portion and tapered neck portion of the bottle and the adapter collar having a mated inner top surface and the top portion of the bottle having a mated outer top surface, the mated inner top surface of the adapter collar being in contact with the mated outer top surface of the bottle and the adapter collar having an opening and a flange provided along the opening of the adapter collar, wherein the flange engages a crimp area for securing the valve assembly to the adapter collar*, the adapter collar surrounding a portion of the main body of the bottle.

4. The container of claim [1] *3*, the pressurized fluid contained in the bottle being an aerosol.

5. The container of claim [1] *3*, further comprising a base cover that surrounds the bottom of the bottle, the base cover being separated from the [plastic] adapter collar by at least a portion of the body of the bottle.

6. The container of claim 5, the base cover being in contact with the bottom of the bottle.

7. The container of claim 5, the base cover further surrounding a portion of the main body of the bottle.

8. The container of claim 5, the base cover having one or more through holes capable of draining fluid present between the base cover and the bottle.

9. The container of claim [1] *3*, further comprising a sleeve, the sleeve surrounding the top portion, tapered neck portion and main body of the bottle.

10. The container of claim 9, the adapter collar being between the sleeve and the bottle.

11. The container of claim 9, further comprising a base cover that surrounds the bottom of the bottle, wherein a portion of the base cover being between the sleeve and a portion of the main body of the bottle.

12. The container of claim 9, a portion of the sleeve being in contact with the main body of the bottle.

13. The container of claim 9, the sleeve being made a heat shrink sleeve.

14. The container of claim 2, the tapered neck portion of the bottle having an outer surface and the portion of the adapter collar surrounding the tapered neck portion of the bottle having an inside surface, wherein the [entire] inside surface of the adapter collar surrounding the tapered neck portion of the bottle is in direct contact with the outer surface of the tapered neck portion of the bottle.

[15. A container comprising:

a plastic bottle comprising a top portion having an opening, a tapered neck portion, a main body and a bottom, the top portion of the bottle having a threaded outer top surface;

a plastic adapter attached to the plastic bottle, the plastic adapter collar positioned over the top portion of the bottle, wherein the adapter collar surrounds the top portion and the tapered neck portion of the bottle and the plastic adapter collar being in contact with the top portion and the tapered portion of the bottle, and the plastic adapter having a threaded inner top surface, the plastic adapter collar being attached to the bottle by engaging the threaded portion of the inner top surface of the plastic adapter collar with the threaded outer top surface of the bottle and the plastic adapter collar having an opening and a flange provided along the entire opening, the flange being shaped to facilitate a crimp area for securing a valve assembly to the adapter collar;

the valve assembly being secured to the plastic adapter collar, wherein the valve assembly and adapter collar cover the opening in the top portion of the bottle;

wherein the plastic bottle, plastic adapter collar and valve assembly together contain a pressurized fluid.]

[16. The container of claim 15, further comprising a base cover that surrounds the bottom of the plastic bottle, the base cover having one or more through holes.]

[17. The container of claim 15, further comprising a sleeve, the sleeve in contact with the plastic adapter collar, a portion of the main body of the bottle.]

[18. The container of claim 17, the sleeve being a heat shrink sleeve.]

19. The container of claim [17] *9*, the sleeve being made of polyethylene terephthalate or a glycol-modified polyethylene terephthalate.

[20. The container of claim 17, farther comprising a base cover that surrounds the bottom of the bottle, wherein a portion of the base cover being between the sleeve and a portion of the main body of the bottle.]

21. The container of claim [15] *3*, the [plastic] adapter collar being made of polyethylene terephthalate (PET), high density polyethylene (HDPE), low density polyethylene (LDPE), ultra high-molecular weight polyethylene (UHMWPE), polypropylene (PP) or nylon.

* * * * *